(12) United States Patent
Fujisato et al.

(10) Patent No.: US 8,292,271 B2
(45) Date of Patent: Oct. 23, 2012

(54) AERATION UNIT, AERATION APPARATUS EQUIPPED THEREWITH AND METHOD OF AERATION

(75) Inventors: Tetsuhiko Fujisato, Ube (JP); Jun Ma, Ube (JP)

(73) Assignees: Tetsuhiko Fujisato, Yamaguchi (JP); Jun Ma, Yamaguchi (JP); Yoshiaki Ikeda, Yamaguchi (JP)

( * ) Notice: Subject to any disclaimer, the term of this patent is extended or adjusted under 35 U.S.C. 154(b) by 432 days.

(21) Appl. No.: 12/450,546

(22) PCT Filed: Mar. 28, 2008

(86) PCT No.: PCT/JP2008/056232
§ 371 (c)(1),
(2), (4) Date: Sep. 29, 2009

(87) PCT Pub. No.: WO2008/123467
PCT Pub. Date: Oct. 16, 2008

(65) Prior Publication Data
US 2010/0044322 A1 Feb. 25, 2010

(30) Foreign Application Priority Data

Mar. 30, 2007 (JP) ................................. 2007-117706

(51) Int. Cl.
*B01F 3/04* (2006.01)
(52) U.S. Cl. ...................... 261/116; 210/220; 210/221.2
(58) Field of Classification Search .................. 261/116; 210/220, 221.2
See application file for complete search history.

(56) References Cited

U.S. PATENT DOCUMENTS
4,690,756 A * 9/1987 Van Ry ...................... 210/221.2

FOREIGN PATENT DOCUMENTS
| JP | 44-26634 | 11/1969 |
| JP | 58-3693 | 1/1983 |
| JP | 2004-141730 | 5/2004 |
| JP | 2006-326524 | 12/2006 |
| WO | WO 2005/121031 | 5/2007 |

* cited by examiner

*Primary Examiner* — Robert A Hopkins
(74) *Attorney, Agent, or Firm* — Muramatsu & Associates

(57) ABSTRACT

An aeration unit, an aeration apparatus and a method of aeration are provided that can quickly realize water quality with gas dissolution balance appropriate for living creatures in water, and that can be utilized for treating polluted water at sewage treatment facilities and used in a gas-liquid contact step at chemical plants or others. A multiple stage aeration apparatus constituted with an air diffuser for producing bubbles in water, a liquid foam generating channel part for changing bubbles in water into liquid foam bodies (soap-bubble-like liquid foam aggregate), a gas retention chamber having a space capable of retaining gas in water and a bubble accumulating part for collecting bubbles newly released from below the gas retention chamber and feeding the bubbles to the liquid foam generating channel part connected to the upper part thereof is disclosed.

3 Claims, 13 Drawing Sheets

FIG. 1
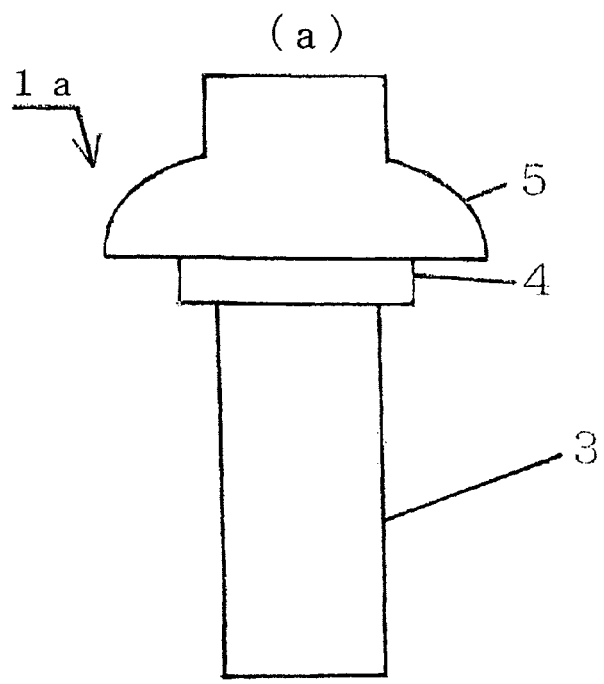
(a)
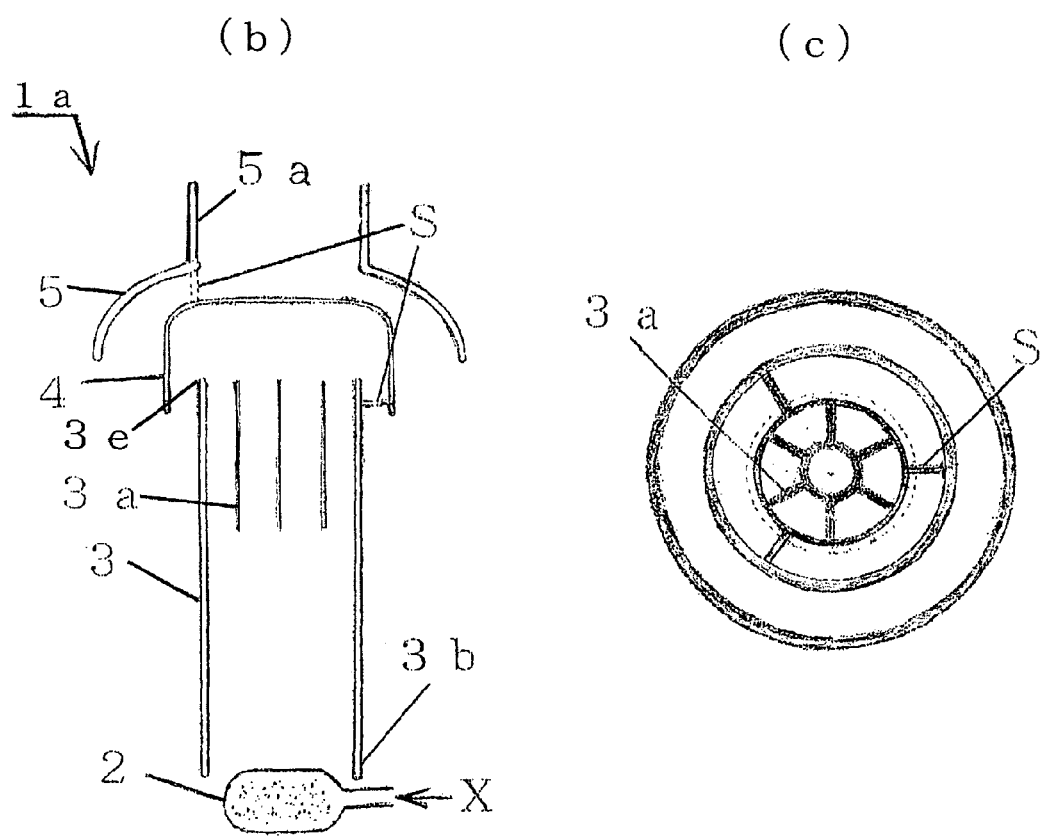
(b)                    (c)

FIG.4
(a)
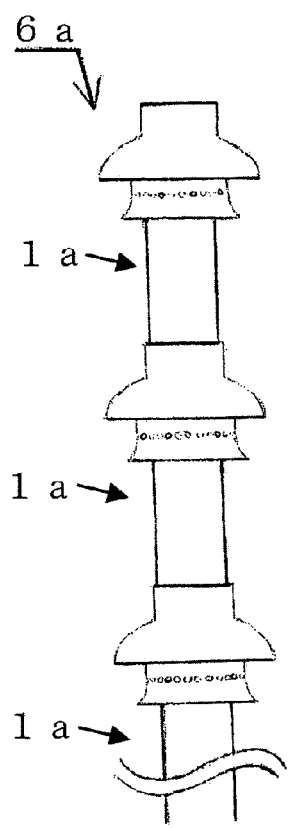
(b)
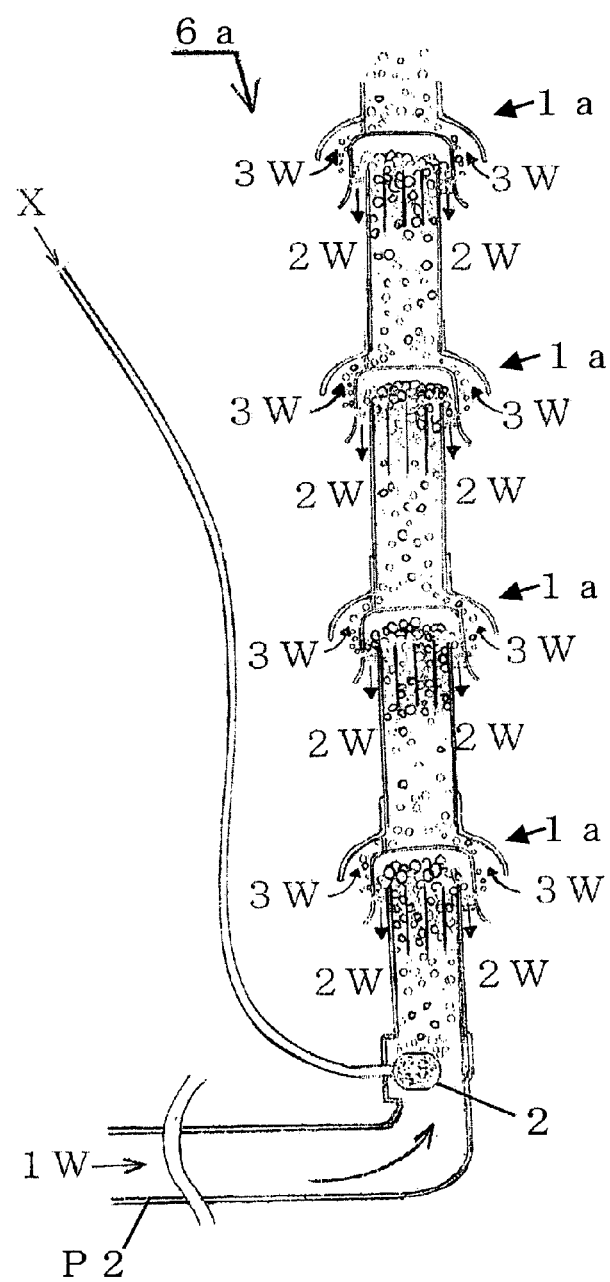

FIG.5 (a)
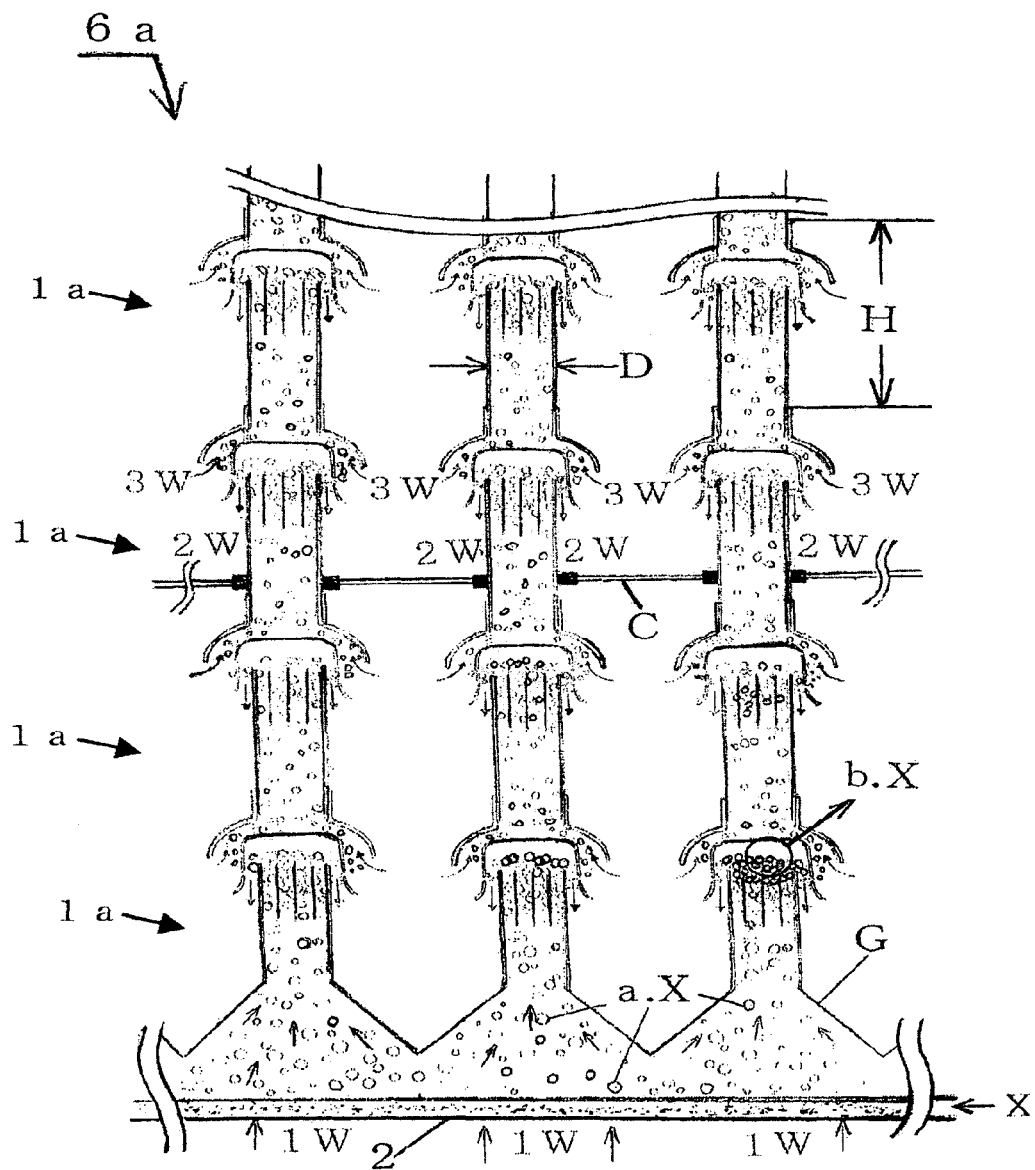
(b)
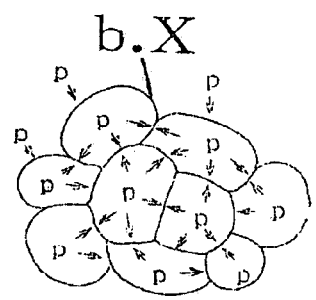

AERATION UNIT, AERATION APPARATUS EQUIPPED THEREWITH AND METHOD OF AERATION

TECHNICAL FIELD

The present invention relates to an aeration unit, an aeration apparatus equipped with the aeration unit, and a method of aeration which change bubbles such as oxygen and air released from air diffusing pipes under water mainly in lakes, ponds, fish-and-shellfish breeding ponds, polluted water treatment facilities or the like into liquid foam, thereby generating liquid foam bodies (soap-bubble-like liquid foam aggregate), thus enabling the realization of water quality with gas dissolution balance appropriate for aquatic organisms, and, in particular, to an aeration unit, an aeration apparatus equipped with the aeration unit and a method of aeration which can be utilized in a gas liquid contact step in chemical plants and in treatment of polluted water in sewage treatment facilities or the like.

BACKGROUND ART

An aeration apparatus and a method of aeration conventionally used in lakes, ponds, fish-and-shellfish breeding ponds, polluted water treatment facilities or the like include a surface-agitation type aeration apparatus using an electric motor to agitate the surface of water with agitation blades as well as an air diffuser, an aeration apparatus and a method of aeration in which gas is released from air diffusing pipes arranged at the bottom thereof to generate bubbles in water, thereby bringing water and gas into contact with each other.

For example, Japanese Patent Application Laid-Open Publication No. 2006-326524 has disclosed an invention of an air diffuser in which, with the aim of improving the efficiency of oxygen dissolution by decreasing bubble diameters to be produced to increase a gas-liquid contact area, a meshed cloth is used on an air-diffusing surface. Further, Japanese Patent Application Laid-Open Publication No. 2004-141730 has disclosed inventions of a method of aeration and an aeration apparatus used in a sewage treatment system in which microbubbles (the diameter of which is $100\mu$ or smaller) are produced in an aeration tank to agitate polluted water.

However, in the above-described conventional air diffusers, aeration apparatuses and methods of aeration described in Publication Nos. 2006-326524 and 2004-141730, a gas dissolution method based on the fact that gas is made smaller in size to increase the contact area of gas with liquid to prolong the contact time of gas with liquid is adopted, thereby posing a problem that oxygen is supplied at an extremely low efficiency. Further, where conventional aeration is repeated in which pressure is applied to air inside a water tank having aquatic organisms, these organisms consume oxygen gas of gas components dissolved in water, thereby the water of the tank is finally changed into that containing a large amount of unnecessary gases such as nitrogen gas and is inferior in gas dissolution balance. In other words, there is a problem that the above method is unable to make water quality in a tank appropriate for aquatic organisms.

Means for Solving the Problems

The present invention is to solve the above problems, an object of which is to provide an aeration unit, an aeration apparatus equipped with the aeration unit and a method of aeration which change bubbles produced from air diffusing pipes disposed in water into liquid foam to generate liquid foam bodies, thereby these liquid foam bodies are exposed to gas retained in water and burst, thus making it possible to effect gas displacement of water to be treated most efficiently. Further, the object is to provide those which change bubbles into liquid foam bodies by the number of connected aeration units to fully utilize the thus supplied gas, thus making it possible to improve water quality in rivers, lakes, ponds or the like and supply oxygen in a gas liquid contact step in chemical plants and to aquatic organisms in an energy saving mode and with high efficiency.

The aeration unit in the first aspect of the present invention is an aeration unit installed in water and provided with an air diffuser for producing bubbles, a cylindrically-shaped liquid foam generating channel part installed above the air diffuser so that the bubbles can ascend internally, a cup-shaped gas retention chamber connected to the upper part of the liquid foam generating channel part, and a cup-shaped bubble accumulating part installed above the gas retention chamber to have an opening part on the upper face. The aeration unit is characterized in that the upper end of the liquid foam generating channel part is disposed inside the gas retention chamber, liquid foam bodies (soap-bubble-like liquid foam aggregate) generated from bubbles inside the liquid foam generating channel part are exposed to gas inside the gas retention chamber and burst, released into water below the gas retention chamber, thereby giving new bubbles, these bubbles are collected at the bubble accumulating part and fed above from the opening part.

The above constitution provides the following actions.
(1) Bubbles produced by air diffusers (air diffusing pipe, air diffusing plate, air diffusing membrane, air stone and the like) disposed in water will ascend by a buoyant force and ascend together with surrounding water of bubbles.
(2) When bubbles ascend inside the liquid foam generating channel part, liquid foam bodies are generated.
(3) Liquid foam bodies generated continuously from the liquid foam generating channel part are exposed to gas at the gas retention chamber and burst, by which new bubbles are released into water.
(4) The new bubbles released into water are collected by the bubble accumulating part and released from the opening part.

The aeration unit in the second aspect of the present invention is the aeration unit in the first aspect and is further provided with a siphon part installed below the gas retention chamber so that separated water generated by bursting of liquid foam bodies can descend internally. The aeration unit is characterized in that an upper end of the siphon part is disposed inside the gas retention chamber higher than an upper end of the liquid foam generating channel part.

The above constitution provides the following actions.
(1) Separated water generated by bursting of liquid foam bodies descends through the siphon part, by which the interior of the gas retention chamber is made slightly negative in pressure. Accordingly, surrounding water brought together with bubbles which ascend inside the liquid foam generating channel part is increased in amount. Thereby, liquid foam bodies are produced in a greater amount.
(2) The gas retention chamber to which the siphon part is connected is filled thereinside with a large number of liquid foam bodies and gas separated from liquid foam bodies is also fed to the bubble accumulating part after once descending from above the gas retention chamber, by which siphon phenomena inside the aeration unit can be continuously kept.
(3) Gravitational energy due to a hydraulic head difference will continuously feed treated water downstream.

The aeration apparatus in the third aspect of the present invention is provided with a plurality of aeration units in the first or second aspect and is further characterized in that the opening part of the bubble accumulating part at one of the aeration units is connected to a lower end of the liquid foam generating channel part of the other aeration units.

The above constitution provides the following actions.
(1) Bubbles are changed into liquid foam bodies by the number of connected aeration units.
(2) Each of the aeration units connected in water is different in depth of water and also different in pressure of water. Thereby, gas having a pressure depending on each depth of water is in contact with a water film on the surface of liquid foam bodies. Further, ascending of bubbles to an upper stage will cause the expansion of gas to result in a gradual increase in volume, by which bubbles are produced in an increased amount.

The method of aeration in the fourth aspect of the present invention is characterized by being provided with an air diffusing step for producing bubbles in water, a liquid foam bodies generating step for changing the bubbles into liquid foam while ascending, thereby generating liquid foam bodies, a liquid foam bodies bursting step for exposing the liquid foam bodies to gas retained in water and bursting, thereby producing new bubbles, and a bubbles collecting step for collecting the newly produced bubbles and feeding them above.

The above-described method of aeration provides the following actions.
(1) The air diffusing step continuously generates liquid foam bodies from bubbles produced in water by way of liquid foam.
(2) To gas which is retained in water to have a pressure depending on the depth of water, the liquid foam bodies are continuously exposed.

The method of aeration in the fifth aspect of the present invention is the method of aeration in the fourth aspect and is further characterized in that the diffusing step is performed only for the first time and a series of steps made up of the liquid foam bodies generating step, the liquid foam bodies bursting step and the bubbles collecting step are repeated multiple times, with this order of steps kept.

According to the above-described method of aeration, from a second stage and thereafter, even when no air diffusing step is performed, actions of the invention in the fourth aspect can be repeatedly provided.

Effects of the Invention

The aeration unit in the first aspect of the present invention has the following effects.
(a) Liquid foam bodies are generated from bubbles produced by an air diffuser by way of liquid foam, thus making it possible to give surrounding water of ascending bubbles as a water film on the surface of liquid foam bodies. Further, the liquid foam bodies are exposed to gas retained in water and burst, by which the gas can be dissolved in the water film depending on a pressure of the thus retained gas. Therefore, the aeration unit is excellent in energy savings.
(b) Since the gas used in gas dissolution inside the gas retention chamber can be released again into water to generate new bubbles, the aeration unit is able to use energy efficiently and is excellent in economic efficiency.

The aeration unit in the second aspect of the present invention has the following effects.
(a) Siphon phenomena inside the aeration unit are kept, by which water brought together on ascending of bubbles inside the liquid foam generating channel part is increased in amount, thus making it possible to increase an amount of treated water. Therefore, the aeration unit is excellent in energy savings and economic efficiency.
(b) Treated water by aeration through generation of liquid foam inside the aeration unit can be moved to any desired place due to gravitational force resulting from a hydraulic head difference inside the aeration unit.

The aeration apparatus in the third aspect of the present invention has the following effects.
(a) In water, water to be treated is changed into a water film of liquid foam bodies in gas having a pressure depending on the depth of water, by which the gas can be brought into contact with the water film efficiently. Thus, it is possible to easily produce water rich in dissolved oxygen in a desired amount.
(b) Since bubbles are changed into liquid foam bodies repeatedly by the number of connected aeration units, gas supplied in water can be fully utilized without any loss. Therefore, the aeration apparatus is excellent in energy savings and economic efficiency.
(c) Since the aeration apparatus is simple in structure, metal materials such as stainless steel and plastic molded articles or the like can be used to produce the aeration apparatus at a reasonable cost.

According to the method of aeration in the fourth aspect of the present invention, the thus produced bubbles are changed into liquid foam bodies in the liquid foam bodies generating step, thus making it possible to keep water to be treated in a state that gas can be exchanged most efficiently. Thus, the method is excellent in energy efficiency.

According to the method of aeration in the fifth aspect of the present invention, gas supplied to the air diffusing step can be utilized multiple times, thereby the method is excellent in energy savings and economic efficiency.

BRIEF DESCRIPTION OF THE DRAWINGS

FIGS. 1(a) to 1(c) are respectively an external view, a longitudinal sectional view and a top view of an aeration unit of a first embodiment in the present invention.

FIGS. 2(a) and 2(c) are external views of the aeration unit, while FIGS. 2(b) and 2(d) are longitudinal sectional views thereof respectively shown in FIGS. 2(a) and 2(c).

FIGS. 4(a) and 4(b) are drawings showing a state that surrounding water (water to be treated) of an air diffuser is guided from a horizontal direction into an aeration apparatus constituted by connecting the aeration units of FIGS. 1(a) to 1(c) in multiple stages. FIGS. 4(a) and 4(b) are respectively an external view and a longitudinal sectional view of the aeration apparatus.

FIG. 5(a) is a schematic view showing a state that in the aeration apparatus of FIGS. 4(a) and 4(b), a guide attached to the lowermost aeration unit is used to catch bubbles produced from an existing air diffuser, and FIG. 5(b) is an enlarged view schematically showing liquid foam bodies generated inside the gas retention chamber.

FIGS. 7(a) and 7(b) are respectively an external view and a longitudinal sectional view of the aeration apparatus.

FIG. 10(b) is a schematic view showing a state that the aeration apparatus is installed on a treatment tank inside polluted water treatment facilities.

FIG. 13 is a schematic view of an aeration apparatus to which the aeration units of FIG. 11 are connected in multiple stages and disposed at the bottom of a lake or a pond and the like.

DESCRIPTION OF REFERENCE NUMERALS

Figure 2:
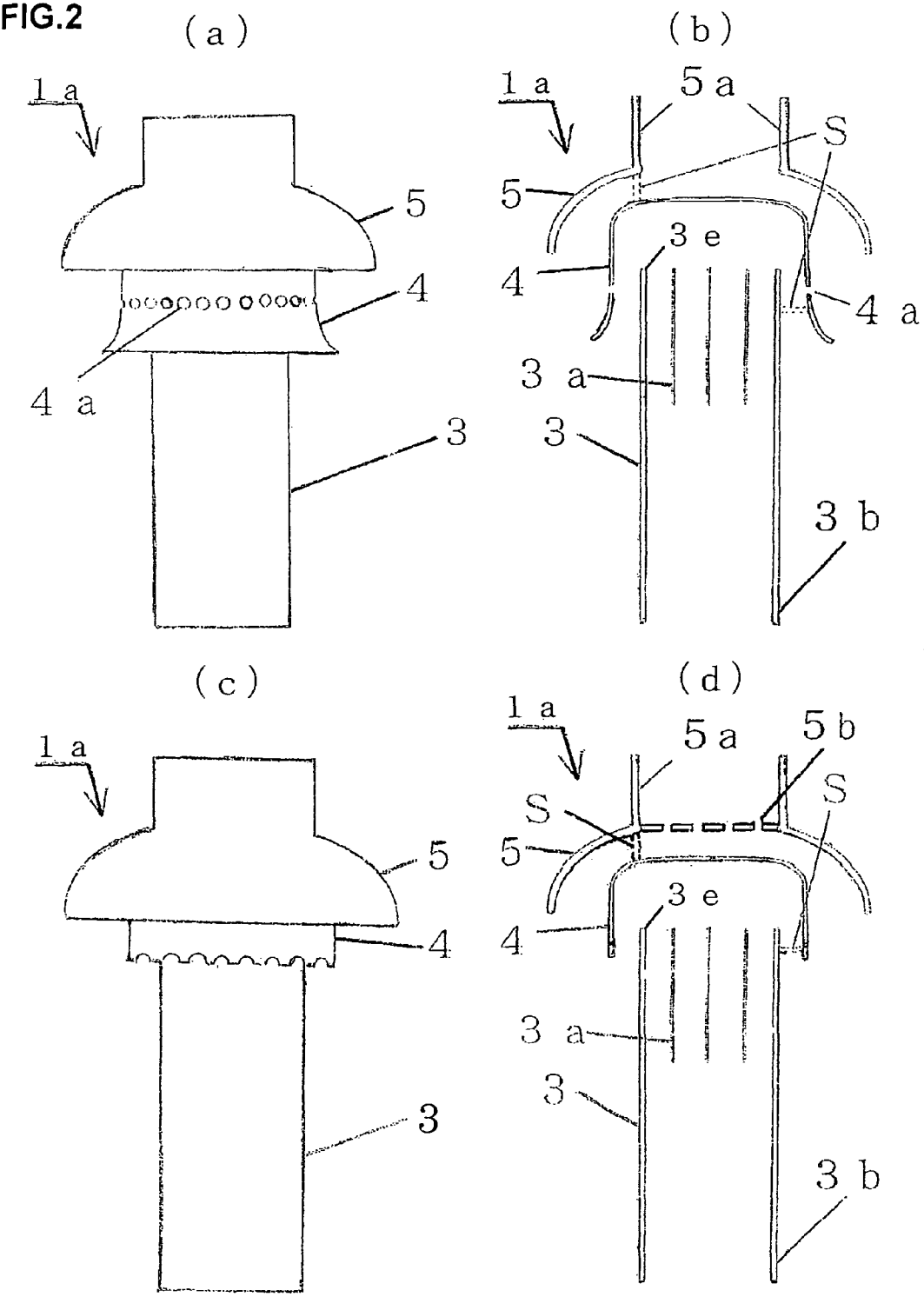
FIGS. 2(a) to 2(d) show a modified example of the aeration unit shown in FIGS. 1(a) to 1(c), where

1a: Aeration unit
1b: Aeration unit
1c: Aeration unit
1W: Surrounding water
2: Air diffuser
2W: Treated water
2WA: Separated water
2Wa: Separated gas
2WB: Descending treated water
2Wb: Descending bubbles
3: Liquid foam generating channel part
3a: Generating channel
3b: Lower end
3C: Siphon part
3d: Upper end
3e: Upper end
3p: Pipe
3W: Surrounding water
4: Gas retention chamber
4a: Port
4b: Water pipe
4G: Range of siphon gas retention chamber part
5: Bubble accumulating part
5a: Opening part
5b: Port
6a: Aeration apparatus
6b: Aeration apparatus
6c: Aeration apparatus
6d: Aeration apparatus
a. X: Bubbles
b. X: Liquid foam bodies
B: Fixing rod
C: Connecting member
C.F: Air blower
D: Diameter of liquid foam generating channel part
G: Guide
H: Length of aeration unit
Hd: Hydraulic head difference
L: Height that causes separation between separated water 2WA and separated gas 2Wa
P: Piping
P1: Bubbles ascending pipe
P2: Pipe
Q: Base point
S: Stay
U.B: Lake bottom
X: Gas
WT: Treatment tank
Wc: Descending convection
Wr: Ascending flow
g: Gaseous matter
f: Water film
m: Water mist

BEST MODE FOR CARRYING OUT THE INVENTION (First Embodiment)

Hereinafter, a detailed description will be given for an aeration apparatus equipped with an aeration unit of a first embodiment in the present invention by referring to FIG. 1 to FIG. 8.

FIGS. 1(a) to 1(c) are respectively an external view, a longitudinal sectional view and a transverse sectional view of the aeration unit of the first embodiment in the present invention.

In FIGS. 1(a) to 1(c), the reference numeral 1a denotes an aeration unit; 2 is an air diffuser for producing bubbles in water; 3 is a cylindrically-shaped liquid foam generating channel part made so that bubbles can ascend thereinside; and 3a denotes a generating channel for easily generating liquid foam bodies from bubbles ascending in water. The reference numeral 3b is a lower end of the liquid foam generating channel part 3 at which a joint part used in connecting the other aeration unit is formed. The reference numeral 4 denotes a cup-shaped gas retention chamber having a space thereinside for retaining gas in water. The reference numeral 5 denotes a bubble accumulating part which is formed in a cup shape so as to collect bubbles newly released below the gas retention chamber 4 and also which has on the upper face an opening part 5a for feeding bubbles above when the other liquid foam generating channel part 3 is connected. S denotes a stay for connecting the liquid foam generating channel part 3, the gas retention chamber 4, and the bubble accumulating part 5. X denotes gas which is fed into the air diffuser 2. In addition, the upper end 3e of the liquid foam generating channel part 3 is disposed inside the gas retention chamber 4. Further, on an inner wall of the opening part 5a at the bubble accumulating part 5, a receiving joint part into which a joint part formed at the lower end 3b for connecting the liquid foam generating channel part 3 of the other aeration unit 1 is formed.

FIGS. 2(a) to 2(d) show a modified example of the aeration unit 1a shown in FIGS. 1(a) to 1(c). FIGS. 2(a) and 2(c) are external views of the aeration unit, while FIGS. 2 (b) and 2(d) are longitudinal sectional views of the aeration unit respectively shown in FIGS. 2(a) and 2(c). FIGS. 2(a) and 2(b) show the aeration unit in which, below the gas retention chamber 4, a plurality of ports 4a are provided and on release of bubbles into water, the bubbles are made approximately equal in diameter. FIGS. 2(c) and 2(d) show the aeration unit in which inside the bubble accumulating part 5, a port 5b is provided. The ports 4a are provided around the periphery of the gas retention chamber 4 formed in a cup shape in the horizontal direction approximately at the same level, and the horizontal level thereof is set to be lower than the horizontal level of the upper end 3e at the liquid foam generating channel part 3. In addition, the horizontal level of the ports 4a is lower than the horizontal level of the lower end at the bubble accumulating part 5. However, where bubbles released from the ports 4a overflow from the lower end of the bubble accumulating part 5 formed in a cup shape and flow into the cup-shaped bubble accumulating part in a decreased amount, the bubble accumulating part 5 may be extended at the lower end to set the horizontal level thereof lower than the horizontal level of the port 4a, thereby adjusting the amount of bubbles flowing into the bubble accumulating part 5. In the present invention and the embodiments, "cylindrically-shaped" represents a concept which includes not only perfectly "cylindrically-shaped" but also "approximately cylindrically-shaped." Similarly, "cup-shaped" represents a concept which includes not only perfectly "cup-shaped" but also "approximately cup-shaped."

In the aeration unit la structured as shown in FIGS. 1(a) to 2(d), when bubbles ascend inside the liquid foam generating channel part 3 installed in water, the bubbles are changed into liquid foam, from which liquid foam bodies are generated. These liquid foam bodies are exposed to gas inside the gas retention chamber 4 and burst, thereby generating new bubbles. Then, the bubbles are collected at the bubble accumulating part 5 and fed above from an opening part 5a. Behavior of the bubbles will be described by referring to FIGS. 3(a) to 4(b). Further, facilities and others where an air diffuser 2 has already been installed will be described by referring to FIGS. 5(a) to 6. In addition, aeration units shown in the drawings are all those shown in FIG. 2(a). Components shown in FIGS. 1(a) to 2(d) are denoted by the same reference numerals, the explanation of which will be omitted here.

Figure 3:
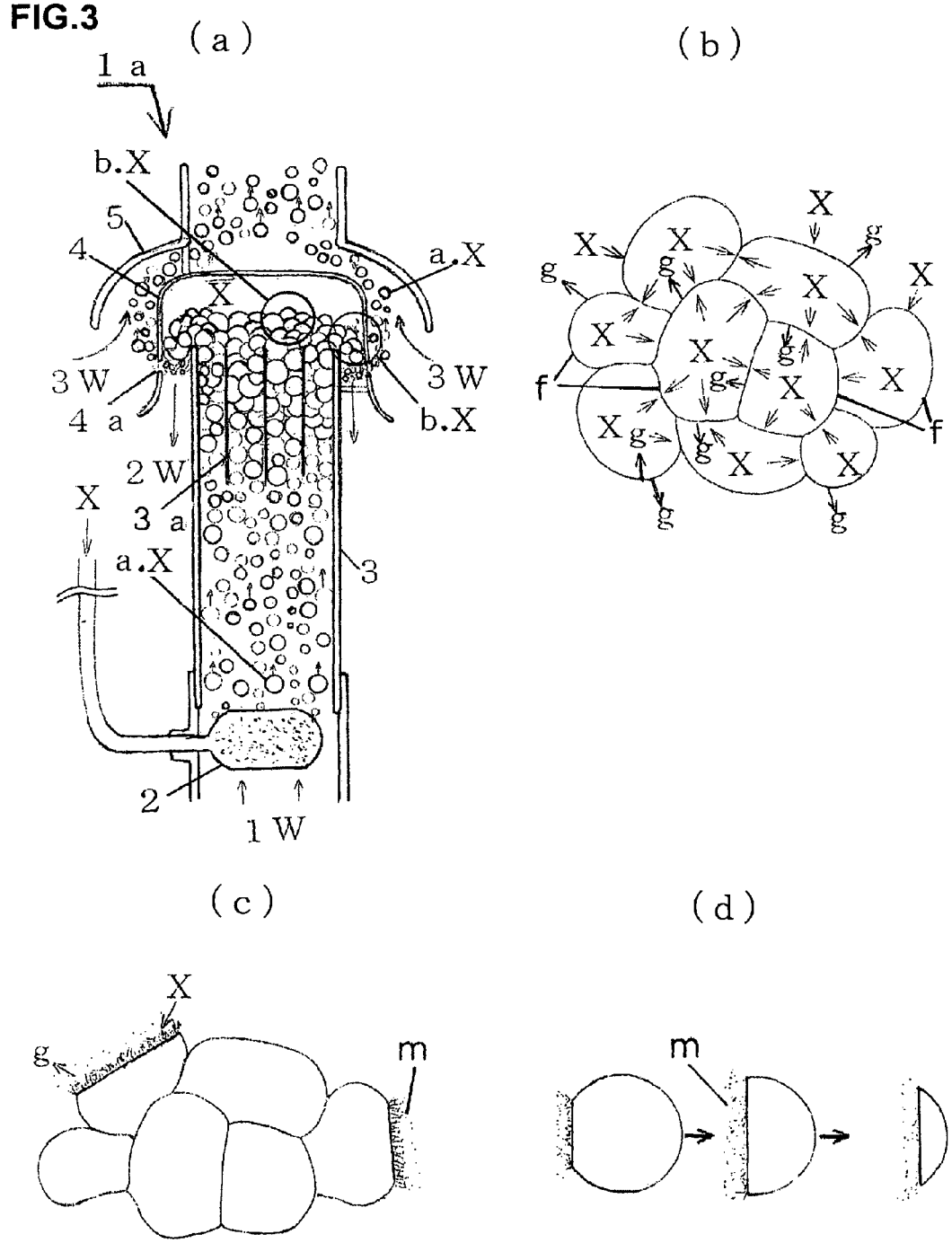
FIG. 3(a) is a schematic view showing behavior of bubbles inside the aeration unit in FIG. 2(b), and FIGS. 3(b) to 3(d) are enlarged views schematically showing liquid foam bodies generated inside a gas retention chamber.

FIG. 3 (a) is a schematic view showing behavior of bubbles a. X inside the aeration unit 1a in FIG. 2(b). FIGS. 3(b) to 3(d) are enlarged views schematically showing liquid foam bodies b. X generated inside the gas retention chamber 4. FIGS. 4(a) and 4(b) show a state that surrounding water (water to be treated) 1W of the air diffuser 2 is guided from a horizontal direction into an aeration apparatus 6a constituted by connecting the aeration units 1a of FIGS. 1(a) and 1(b) in multiple stages, and FIGS. 4(a) and 4(b) are respectively an external view and a longitudinal sectional view of the aeration apparatus 6a. Further, FIG. 5(a) is a schematic view showing a state that in the aeration apparatus 6a of FIGS. 4(a) and 4(b), a guide G attached to the lowermost aeration unit 1a is used to catch bubbles a. X produced from an existing air diffuser 2, and FIG. 5(b) is an enlarged view schematically showing liquid foam bodies b. X generated inside the gas retention chamber 4.

As shown in FIG. 3(a), bubbles a. X produced from the air diffuser 2 ascend together with the surrounding water (water to be treated) 1W inside the liquid foam generating channel part 3 and are changed into liquid foam, while passing through the generating channel 3a. The liquid foam is gathered inside the uppermost gas retention chamber 4 at the liquid foam generating channel part 3, thereby generating liquid foam bodies b. X. Then, as shown in FIG. 3(b), gas X which receives water pressure depending on the depth of water is in contact with a water film f of the liquid foam bodies b. X, thereby gas components in the gas X are absorbed by the water film f according to a partial pressure, or gaseous matter g dissolved excessively inside the water film f is released into an open space according to the partial pressure of gas components. In other words, where oxygen gas is short in the water film f, the oxygen gas is absorbed by the water film f, and where nitrogen gas and hydrogen sulfide gas are excessively dissolved in the water film f, these gases are released from the water film f.

Where a high-speed camera is used to photograph a state that the liquid foam bodies b. X are bursting inside the gas retention chamber 4, as shown in FIGS. 3(c) and 3(d), liquid foam will collapse from the end in the form of water mist (mist) m. Thereby, inside the gas retention chamber 4, the gas X is absorbed in an accelerated manner into the water mist m depending on the partial pressure, or gaseous matter g dissolved in the water mist m are released in a more accelerated manner depending on the partial pressure. Further, the gas X in liquid foam bodies b. X which have burst inside the gas retention chamber 4 is released from the ports 4a into water, and new bubbles a. X ascend and are collected by the bubble accumulating part 5. Further, the water film f which has formed the surface of liquid foam of the liquid foam bodies b. X is discharged as treated water 2W below the gas retention chamber 4. Then, the new bubbles a. X which have been released from the ports 4a ascend together with surrounding water 3W inside the bubble accumulating part 5, and liquid foam bodies b. X are again generated inside the liquid foam generating channel part 3 connected to the upper part thereof. In addition, a series of these motions are repeated by the number of aeration units connected.

As shown in FIGS. 4(a) and 4(b), where a plurality of aeration units la are connected in multiple stages and a pipe P2 and others are connected in the horizontal direction below the air diffuser 2, surrounding water (water to be treated) 1W is guided via the pipe P2 from the horizontal direction continuously and supplied into the aeration apparatus 6a. For example, if the pipe P2 is disposed at the bottom of a lake or a pond and the surrounding water 1W is guided from various directions and subjected to aeration, it is possible to cause convection of water in a lake or a pond.

Where the aeration units 1a connected in multiple stages as described above are coupled by a connecting member C and attached to an existing air diffuser 2, as shown in FIGS. 5(a) and 5(b), bubbles a. X produced by the air diffuser 2 are caught by the guide G and guided into the liquid foam generating channel part 3. Then, liquid foam bodies b. X are generated, exposed inside a gaseous space in water and burst, by which new bubbles a. X are released. Since a series of these motions are repeated by the number of aeration units, it is possible to easily produce a large amount of water rich in dissolved oxygen.

Figure 6:
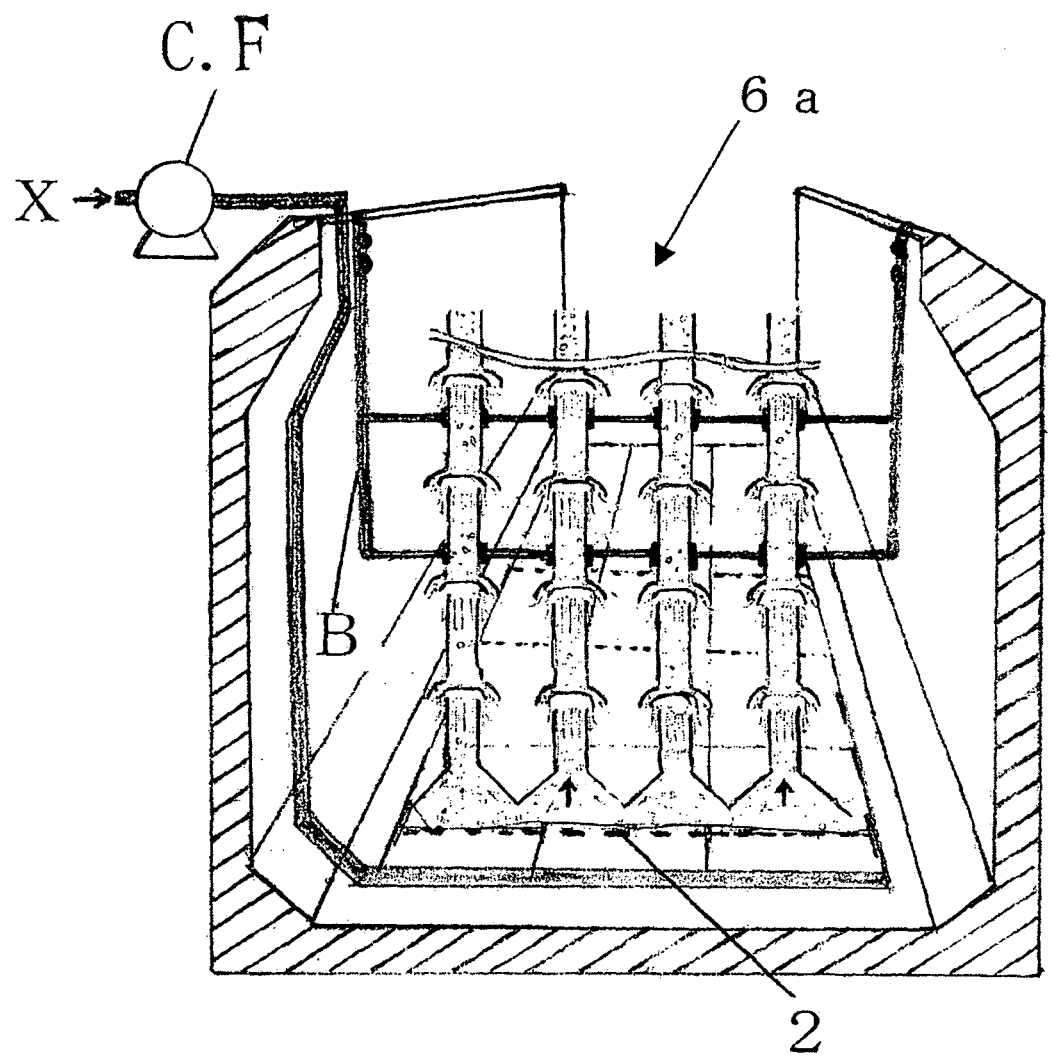
FIG. 6 is a schematic view showing a state that a fixing rod is used to fix the aeration apparatus of FIGS. 5(a) and 5(b) at an upper part of an air diffuser inside polluted water treatment facilities.
Figure 7:
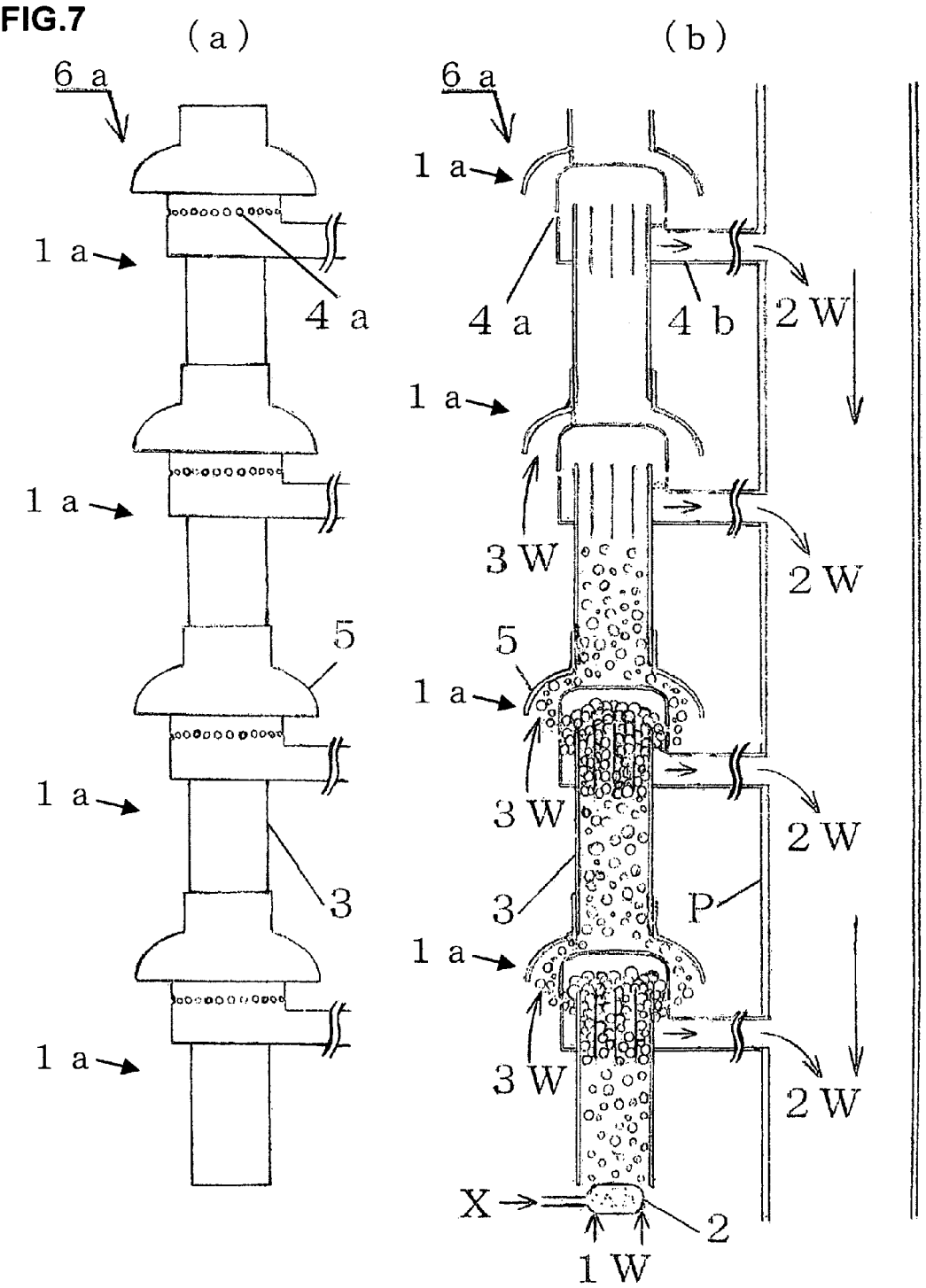
FIGS. 7(a) and 7(b) are drawings showing a state that water pipes are individually connected to gas retention chambers of a plurality of aeration units connected in multiple stages.

FIG. 6 is a schematic view showing a state that a fixing rod B is used to fix the aeration apparatus 6a of FIG. 5(a) at an upper part of the air diffuser 2 inside polluted water treatment facilities. In addition, C.F denotes an air blower for supplying gas X to the air diffuser 2. FIGS. 7(a) and 7(b) show a state that water pipes 4b are individually connected to gas retention chambers 4 in a plurality of aeration units 1a connected in multiple stages. FIGS. 7(a) and 7(b) are respectively an external view and a longitudinal sectional view of the aeration apparatus 6.

As shown in FIGS. 7(a) and 7(b), where the gas retention chambers 4 of these aeration units 1a are individually enclosed and the water pipe 4b is connected, treated water 2W discharged below the gas retention chamber 4 flows through the water pipe 4b into the piping P.

Thereafter, the treated water 2W is fed, due to a hydraulic head difference, to a lower part of the piping P.

Figure 8:
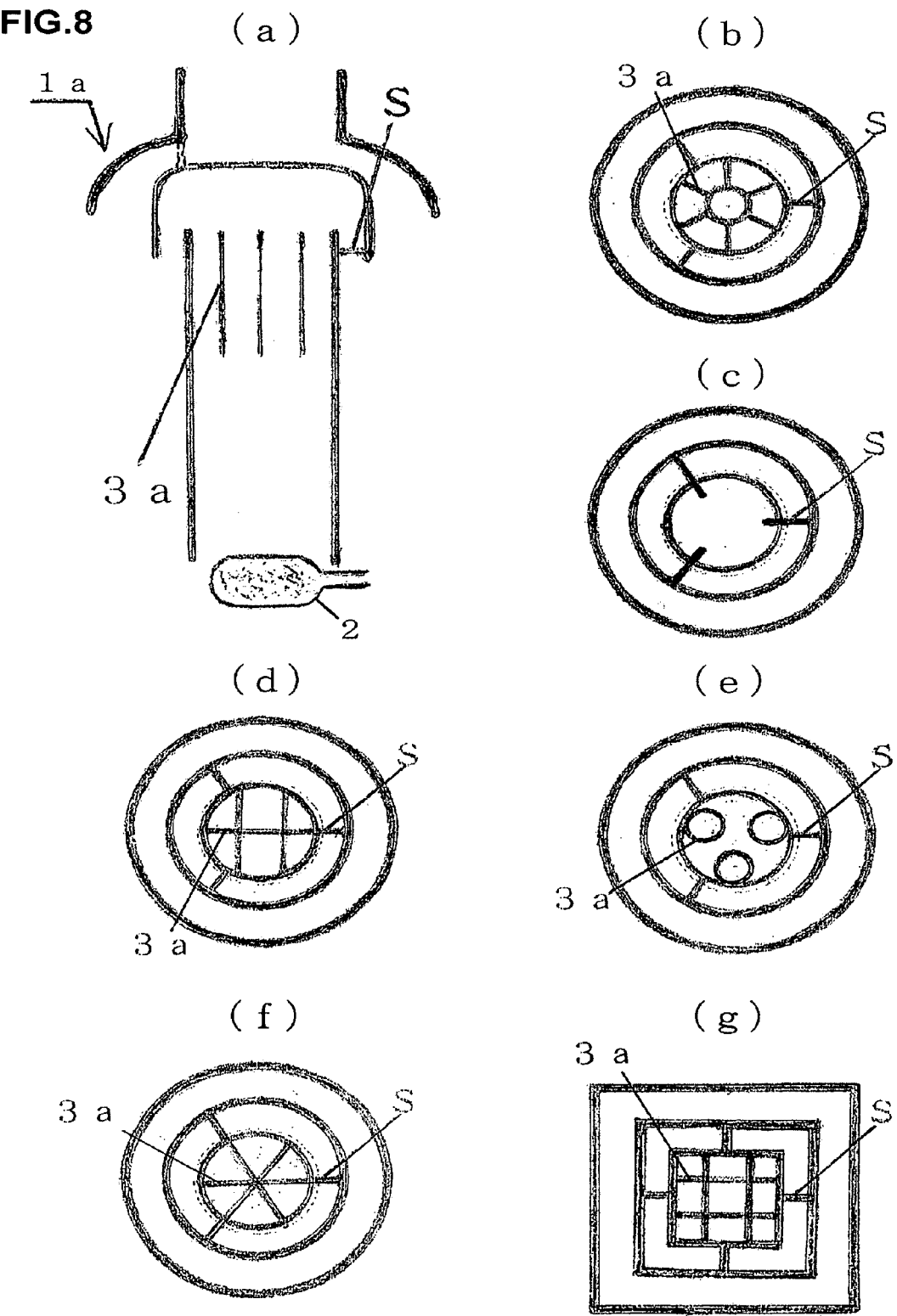
FIG. 8 (a) is a longitudinal sectional view of the aeration unit of FIGS. 1(a) to 1(c), and FIGS. 8(b) to 8(g) are top views of aeration units showing modified examples of the generating channel of liquid foam shown in FIG. 8(a).

FIG. 8 (a) is a longitudinal sectional view of the aeration unit of FIGS. 1(a) to 1(c), and FIGS. 8(b) to 8(g) are top views of an aeration unit showing modified examples of a generating channel of liquid foam shown in FIG. 8(a).

In addition, water to be treated which ascends inside the liquid foam generating channel part 3 together with bubbles a. X is varied in its state depending on the viscosity thereof and also influenced by contamination with foreign matter. Therefore, the aeration unit of the present embodiment shall not be limited to that shown in FIGS. 1(a) to 1(c) but may be modified, for example, in the structure and the shape of the generating channel 3a depending on a state of the water to be treated, as shown in FIGS. 8(a) to 8(g). Further, with regard to water to be treated at sewage treatment facilities or the like which is easily influenced in particular by the viscosity and contamination with foreign matter, as shown in FIG. 8(c), the generating channel 3a may be simplified in structure.

However, fundamentally, the liquid foam generating channel part 3 and the generating channel 3a are acceptable as long as they are formed in a cylindrical shape. As shown in FIGS. 8(b) to 8(g), the horizontal cross section may be formed in a circular shape, a fan-like shape, a polygonal shape or in a combination thereof and shall not be limited to a specific shape.

Next, a description will be given for an aeration apparatus which is substantially similar in shape to that shown in FIGS. 5(a) to 5(c) on the basis of results obtained by actually installing the apparatus in sewage treatment facilities to measure dissolved oxygen (DO).

The aeration apparatus is constituted with 170 mm-long (H) aeration units 1a connected in five stages, each of which is equipped with a round and cylindrically-shaped liquid foam generating channel part 3 having a diameter (D) of 50 mm, and a guide G is attached to the lowermost aeration unit 1a. The thus structured aeration apparatus was installed in sewage treatment facilities located in the eastern part of Ube City to measure dissolved oxygen (DO) at sites where treated water 2W was discharged.

A dissolved oxygen (DO) meter was used to measure the dissolved oxygen (DO) of raw water (temperature of 18.4° C.) in an aeration tank, thereby finding the dissolved oxygen (DO) of 0.7 ppm. On the other hand, the dissolved oxygen (DO) of treated water 2W discharged from the above aeration apparatus was found to be approximately 3.7 ppm. In other words, as compared with the surrounding raw water, the treated water was increased in dissolved oxygen (DO) five times or more. In addition, visual observation confirmed that ascending bubbles were smaller in amount. Further, no adjustment was made for a supplying amount of bubbles.

Next, at a seafood processing company in Hofu City, the aeration apparatus was installed, as shown in FIGS. 4(a) and 4(b), to conduct an experiment of increasing the dissolved oxygen (DO) of underground seawater pumped up from under the ground.

The underground seawater pumped up from under the ground (temperature of 17.6° C.) was measured by using a dissolved oxygen (DO) meter for dissolved oxygen DO, which was approximately zero ppm, with substantially no oxygen gas dissolved.

A 20-watt diaphragm blower was used to measure underground seawater and supply gas X to an air stone (air diffuser 2) sold at a home improvement store. Then, measurement was made for the treated water 2W discharged continuously, thereby finding that the dissolved oxygen (DO) was 6.7 ppm after one-time passage.

(Second Embodiment)

Hereinafter, a detailed description will be given for an aeration unit and an aeration apparatus of a second embodiment of the present invention by referring to FIG. 9 to FIG. 13.

Figure 9:
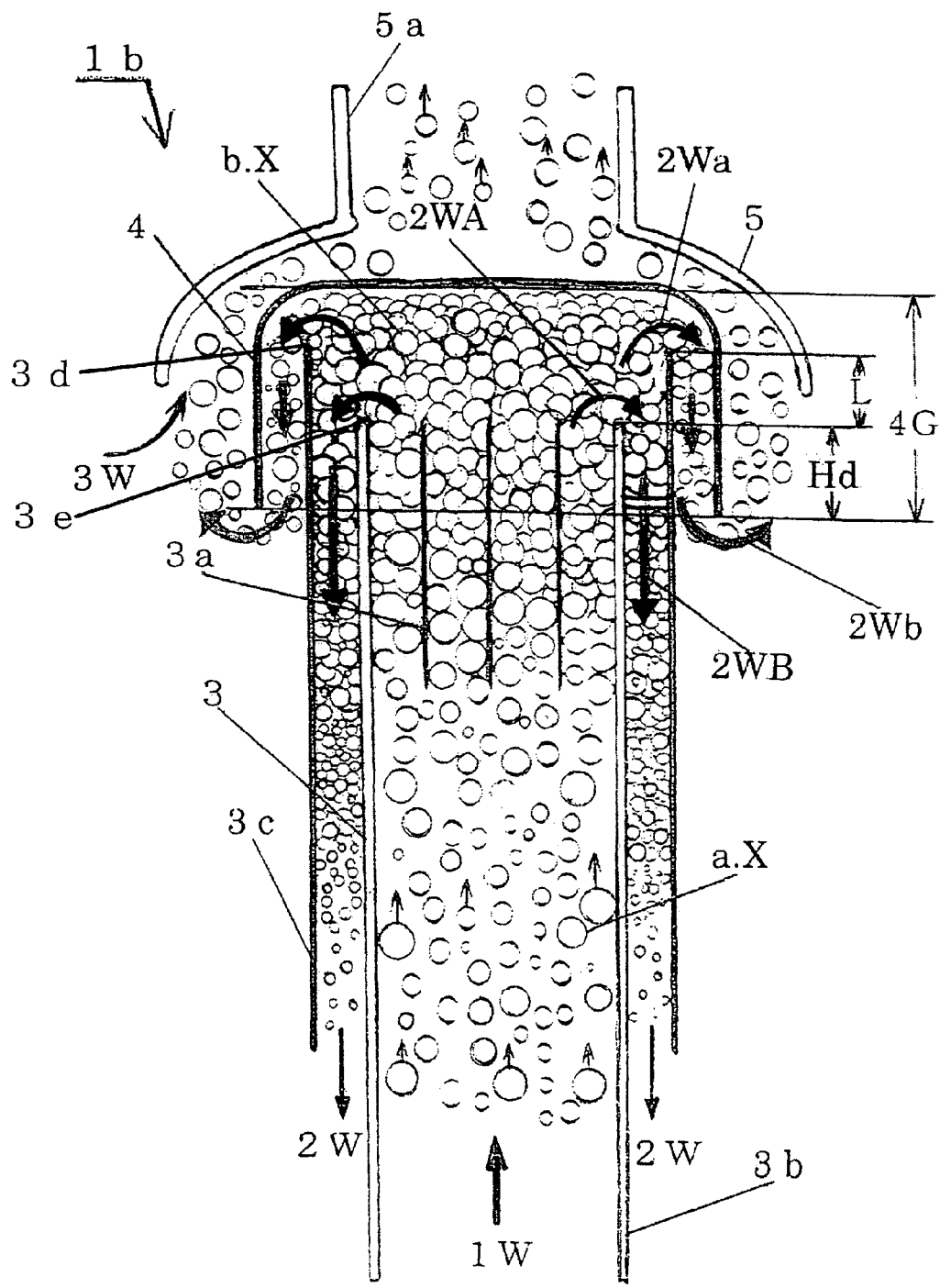
FIG. 9 is a schematic view showing behavior of bubbles inside an aeration unit of a second embodiment in the present invention.

FIG. 9 is a schematic view showing behavior of bubbles inside the aeration unit 1b of the second embodiment in the present invention.

The reference numeral 1W depicts surrounding water (water to be treated) entrained with bubbles a. X ascending inside a liquid foam generating channel part 3; 3a is a generating channel for easily generating liquid foam bodies b. X from bubbles ascending in water; 4 depicts a cup-shaped gas retention chamber having a space thereinside so as to retain gas in water; 4G is a range of a siphon gas retention chamber part; 3c is a siphon part installed below the gas retention chamber 4 in such a manner that separated water 2WA generated by bursting of liquid foam bodies b. X descends thereinside; 2W denotes treated water which is aerated by changing water into liquid foam; and 3W depicts surrounding water entrained when descending bubbles 2Wb ascend toward a bubble accumulating part 5 located above. The reference numeral 3b is a lower end of the liquid foam generating channel part 3 at which a joint part used for connecting with the other aeration unit is formed. The reference numeral 5a is an opening part for feeding bubbles a. X above where the other liquid foam generating channel part 3 is connected, and on an inner wall of the opening part 5a, in order to connect the liquid foam generating channel part 3 of the other aeration unit, a receiving joint part for fitting a joint part at the lower end 3b of the liquid foam generating channel part 3 is formed, and an upper end 3e of the liquid foam generating channel part 3 is disposed inside the gas retention chamber 4. Then, an upper end 3d of the siphon part 3c is disposed higher only by the height L than the upper end 3e of the liquid foam generating channel part 3. In other words, L indicates a height by which, inside the range 4G of the siphon gas retention chamber part, gravitational force is used to cause separation between separated water 2WA and separated gas 2Wa.

In the above-structured aeration unit 1b, when bubbles a. X produced from an air diffuser or others ascend inside the liquid foam generating channel part 3, surrounding water 1W is entrained. Then, on passage through the generating channel 3a, the bubbles a. X and the surrounding water 1W are changed into liquid foam, and inside the gas retention chamber 4, liquid foam bodies b. X are generated. The liquid foam bodies b. X continuously supplied to the gas retention chamber 4 also burst and are separated substantially into water and gas. Separated water 2WA which becomes heavier than surrounding liquid foam descends due to gravitational force resulting from a hydraulic head difference Hd inside the siphon part 3c as descending treated water 2WB and is given as treated water 2W and discharged below the siphon part 3c. Further, the liquid foam which is light in weight also once descends together with the separated gas 2Wa from above the gas retention chamber 4 and is released as descending bubbles 2Wb from below the gas retention chamber 4.

The descending bubbles 2Wb which have overflowed from the gas retention chamber 4 are collected by the bubble accumulating part 5 above.

The lower end of the bubble accumulating part 5 formed in a cup shape is in FIG. 9 higher than the lower end of the gas retention chamber 4 in terms of the horizontal level. However, where the descending bubbles 2Wb overflow from the bubble accumulating part 5 and enter thereinto in a smaller amount, the lower end of the bubble accumulating part 5 may be set to be lower than, for example, the lower end of the gas retention chamber 4 in terms of the horizontal level, thereby adjusting a flowing amount of the descending bubbles 2Wb.

Figure 10:
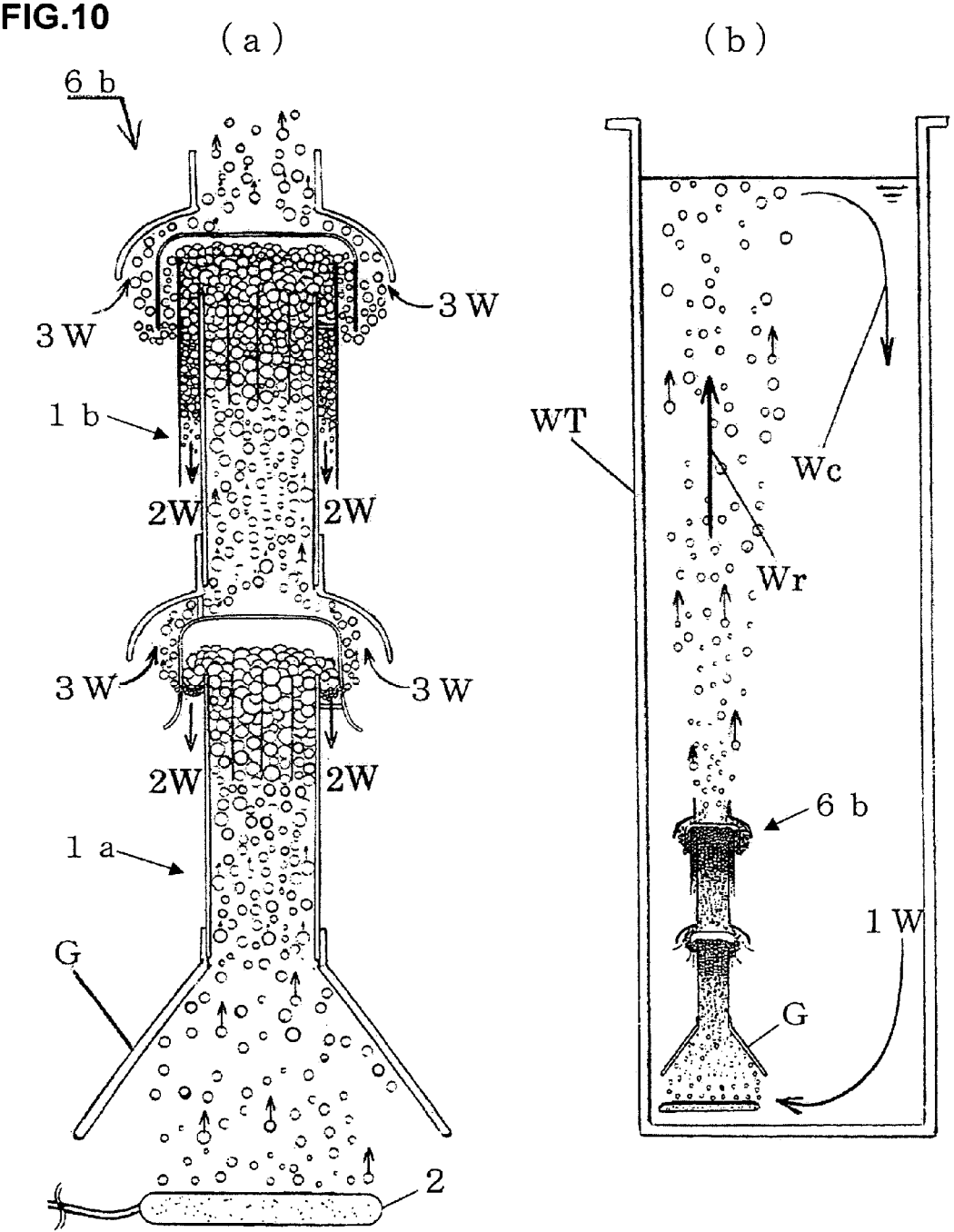
FIG. 10 (a) is a schematic view of an aeration apparatus in which the aeration unit of the second embodiment is connected to the upper part of the aeration unit of the first embodiment.

FIG. 10 (a) is a schematic view of an aeration apparatus 6b in which the aeration unit 1b of the second embodiment is connected to an upper part of the aeration unit 1a in the first embodiment, and FIG. 10(b) is a schematic view showing a state that the aeration apparatus 6b is installed on a treatment tank inside polluted water treatment facilities. In addition, WT denotes a treatment tank capable of retaining water to be treated or others; Wr, an ascending flow; Wc, a descending convection in which the ascending flow Wr arrives at the surface of water and turns around; and 1W, surrounding water at the bottom of the treatment tank WT.

In order to decompose efficiently organic matter at polluted water treatment facilities, it is important that oxygen is supplied to microorganisms to activate them and also water to be treated is subjected to convection, thereby the microorganisms are allowed to be in contact with the organic matter efficiently. By using the aeration apparatus 6b shown in FIG. 10(a), it is possible to attain both purposes. Further, as shown in FIG. 10(b), where the aeration apparatus 6b is installed on a treatment tank inside polluted water treatment facilities equipped with an air diffuser 2, bubbles produced from the air diffuser 2 are caught by the guide G, thus making it possible to operate the apparatus immediately.

Figure 11:
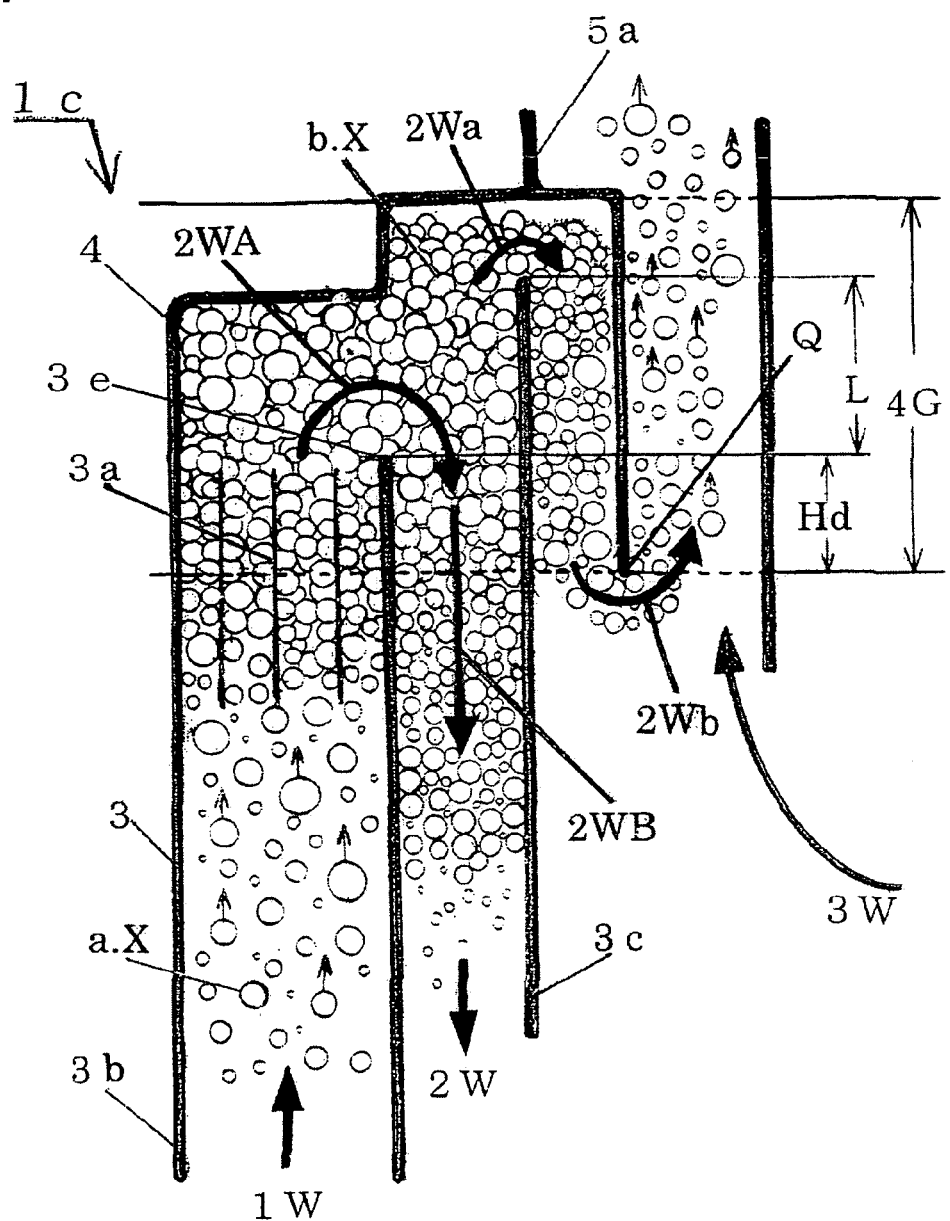
FIG. 11 is a schematic view showing a modified example of the aeration unit shown in FIG. 9.

FIG. 11 is a schematic view showing a modified example of the aeration unit in FIG. 9. In addition, L depicts a height which causes separation between separated water 2WA and separated gas 2Wa, and Q depicts a base point which decides a magnitude of gravitational force with respect to the descending treated water 2WB due to a hydraulic head difference Hd.

As shown in FIG. 11, the aeration unit 1c utilizes siphon phenomena as with the case shown in FIG. 9 and is characterized in that these members of the liquid foam generating channel part 3, the siphon part 3c and the opening part 5a are respectively formed into a pipe shape and connected in parallel.

Figure 12:
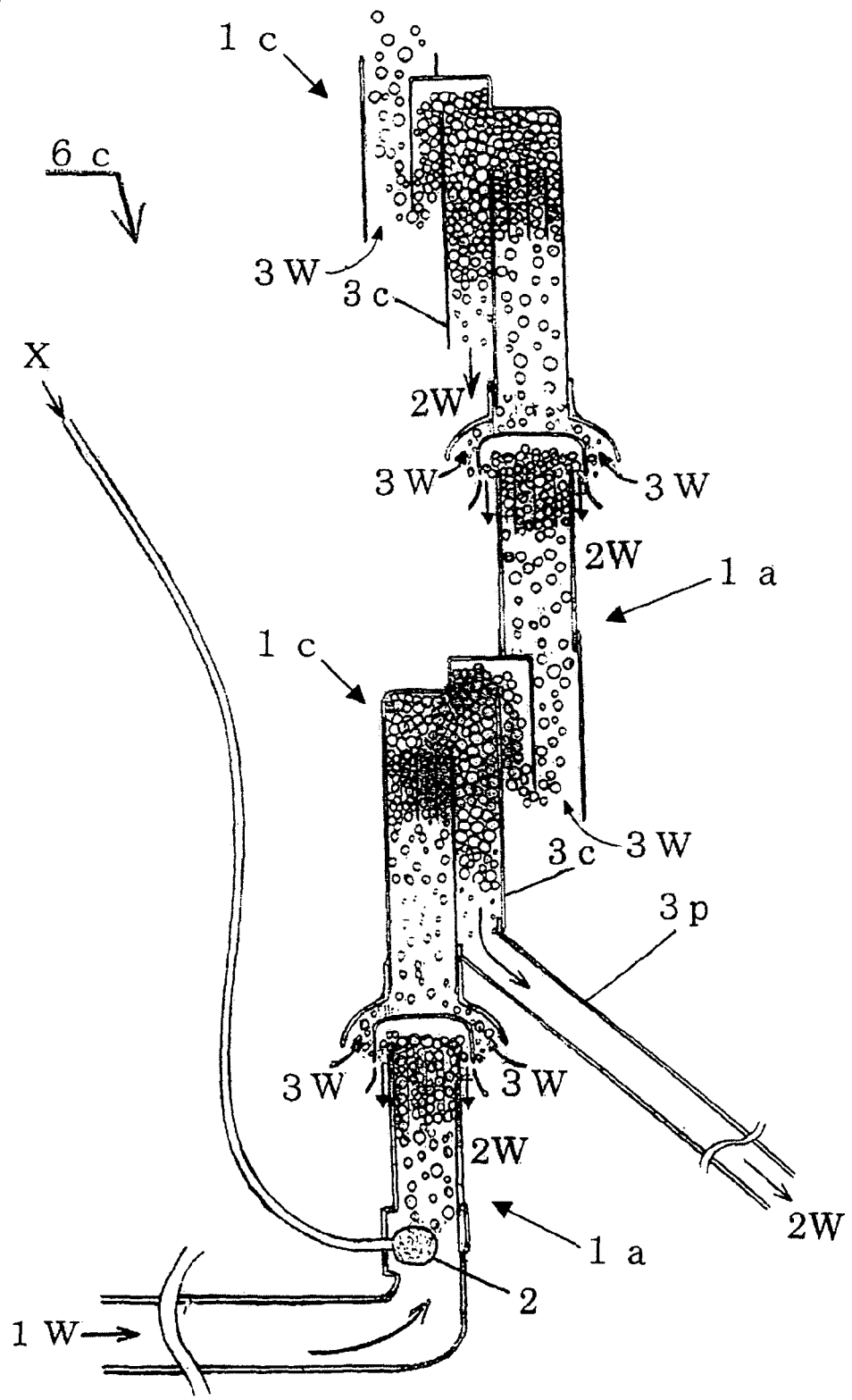
FIG. 12 is a schematic view showing a state that the aeration unit of the first embodiment is alternately connected to the aeration unit of the second embodiment in FIG. 11 in multiple stages.

As described above, these members of the liquid foam generating channel part 3, the siphon part 3c and the opening part 5a are formed into a pipe shape, a joint part is formed at the lower end 3b of the liquid foam generating channel part 3, and a receiving joint part is formed at an upper end of the opening part 5a, by which it is possible to provide such a constitution that the aeration units 1c are connected in multiple stages (refer to FIG. 13) or they are connected in multiple stages in combination with the aeration unit 1a (refer to FIG. 12). Further, to the end of the siphon part 3c, a pipe 3p (refer to FIG. 13) can be connected. Thereby, the descending treated water 2WB made due to a hydraulic head difference Hd within a range 4G at the siphon gas retention chamber part can be fed as treated water 2W by using the pipe 3p to a desired place. Further, since the aeration unit 1c can be manufactured by a resin ejection molding machine, it is available at a reasonable price.

FIG. 12 is a schematic view of the aeration apparatus 6c in which the aeration unit 1a of the first embodiment is alternately connected to the aeration unit 1c of the second embodiment of FIG. 11 in multiple stages.

As shown in FIG. 12, the aeration apparatus 6c is constituted in such a manner that in the aeration unit 1c shown in FIG. 11, the pipe 3p is connected to the lower end of the siphon part 3c, thereby feeding the treated water 2W to a desired place.

Figure 13:
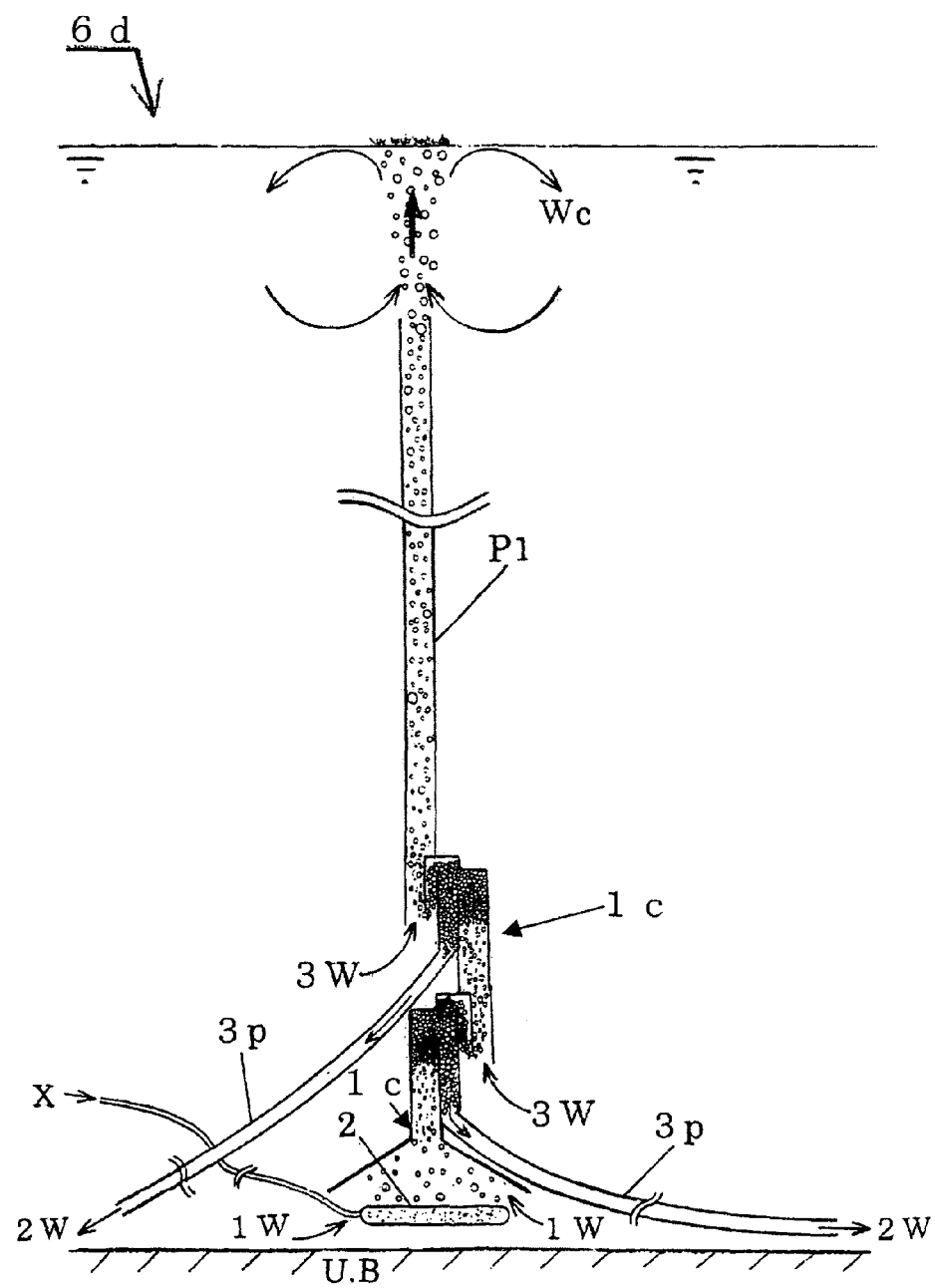

FIG. 13 is a schematic view of an aeration apparatus 6d to which the aeration units 1c shown in FIG. 11 are connected in multiple stages and disposed at a lake bottom U.B, a pond bottom or the like.

As shown in FIG. 13, water at the lake bottom U.B is subjected to aeration in water, and the treated water 2W thereof is fed by using the pipe 3p, thus making it possible to return the treated water 2W to the lake bottom U.B as it is. In this case, water temperature varies to an extremely small extent, by which it is possible to settle the treated water 2W at the lake bottom U.B. Further, the bubbles ascending pipe P1, one end of which is opened near the surface of the water, is connected on the other end to a receiving joint part formed at the opening part 5a, thereby water at a lower layer is not mixed with water at middle and higher layers in a lake or a pond but only water at the lower layer can be subjected to aeration. Further, where it is desired that gaseous matter dissolved in water at the lower layer is released, the bubbles ascending pipe P1 are brought to a place higher than the surface of the water, thus making it possible to release unnecessary gaseous matter dissolved in the water at the lower layer into the atmosphere.

INDUSTRIAL APPLICABILITY

The present invention is applicable as the following aeration apparatuses:
(1) an aeration apparatus for the purpose of supplying oxygen to aquatic organisms,
(2) an aeration apparatus for generating water appropriate for easy habitation of aquatic organisms, with gas dissolution balance kept favorably,
(3) an aeration apparatus used in a gas liquid contact step in a chemical plant, treatment of polluted water and others,
(4) an aeration apparatus for attaining an efficient increase in oxygen concentration of water to be treated at sewage treatment facilities and others, and
(5) an aeration apparatus for supplying oxygen efficiently into a biological filtration tank.

What is claimed is:

1. An aeration unit installed in water comprising:
an air diffuser for producing bubbles;
a cylindrically-shaped liquid foam generating channel part installed above the air diffuser so that the bubbles can ascend internally;
a cup-shaped gas retention chamber connected to the upper part of the liquid foam generating channel part; and
a cup-shaped bubble accumulating part installed above the gas retention chamber to have an opening part on the upper face,
wherein the upper end of the liquid foam generating channel part is disposed inside the gas retention chamber, liquid foam bodies (soap-bubble-like liquid foam aggregate) generated from the bubbles inside the liquid foam generating channel part are exposed to gas inside the gas retention chamber and burst, released into water below the gas retention chamber, thereby generating new bubbles, these bubbles are collected at the bubble accumulating part and fed above from the opening part.

2. The aeration units according to claim 1 further comprising a siphon part installed below the gas retention chamber so that separated water generated by bursting of the liquid foam bodies can descend internally, wherein an upper end of the siphon part is disposed inside the gas retention chamber higher than an upper end of the liquid foam generating channel part.

3. Aeration apparatuses which are provided with a plurality of the aeration units according to claim 1, wherein the opening part of the bubble accumulating part at one of the aeration units is connected to a lower end of the liquid foam generating channel part of the other aeration units.

* * * * *